(12) United States Patent
Kuschnarew et al.

(10) Patent No.: US 8,199,449 B2
(45) Date of Patent: Jun. 12, 2012

(54) METHOD AND A DEVICE FOR MONITORING HIGH-VOLTAGE CONNECTIONS OF A HYBRID VEHICLE

(75) Inventors: Christian Kuschnarew, Würzburg (DE); Volker Hartmann, Castell (DE); Volker Albert, Dettelbach (DE); Matthias Ebert, Dettelbach (DE)

(73) Assignees: Leoni Bordnetz-Systeme GmbH, Nuremberg (DE); Continental Automotive GmbH, Hannover (DE)

(*) Notice: Subject to any disclaimer, the term of this patent is extended or adjusted under 35 U.S.C. 154(b) by 135 days.

(21) Appl. No.: 12/873,532

(22) Filed: Sep. 1, 2010

(65) Prior Publication Data
US 2011/0037317 A1 Feb. 17, 2011

Related U.S. Application Data
(63) Continuation of application No. PCT/EP2009/001413, filed on Feb. 27, 2009.

(30) Foreign Application Priority Data

Mar. 1, 2008 (DE) .......................... 10 2008 011 962
Apr. 30, 2008 (DE) .......................... 10 2008 021 542

(51) Int. Cl.
*H02H 3/00* (2006.01)
*F16P 3/20* (2006.01)
(52) U.S. Cl. ............ 361/88; 361/23; 307/10.1; 307/328
(58) Field of Classification Search .................. 307/10.1, 307/328; 361/23, 88
See application file for complete search history.

(56) References Cited

U.S. PATENT DOCUMENTS

| | | | |
|---|---|---|---|
| 7,081,193 B2* | 7/2006 | Dewey et al. ................. | 205/337 |
| 7,084,361 B1* | 8/2006 | Bowes et al. ............... | 200/16 R |
| 7,235,901 B2* | 6/2007 | Bares et al. .................... | 307/326 |
| 7,537,542 B2* | 5/2009 | Cawthorne et al. ............... | 477/3 |
| 7,579,709 B2 | 8/2009 | Goetz et al. | |

(Continued)

FOREIGN PATENT DOCUMENTS
DE 10102242 A1 7/2002
(Continued)

OTHER PUBLICATIONS
International Search Report dated Aug. 11, 2010.

*Primary Examiner* — Rexford Barnie
*Assistant Examiner* — Christopher Clark
(74) *Attorney, Agent, or Firm* — Laurence A. Greenberg; Werner H. Stemer; Ralph E. Locher

(57) ABSTRACT

A monitoring device for protecting against contact or access to a hybrid vehicle having a plurality of high-voltage components and an electronic control unit connected to a low-voltage vehicle electrical system battery. Power actuators for actuating at least one electric machine are connected to a high-voltage battery by way of a power switch. The high-voltage components are monitored by way of a looped circuit and deactivated if the looped circuit is broken. A sensor that is sensitive to magnetic field changes is disposed in or at a removable contact connection of the electric machine or the electronic control unit. The sensor is connected to the looped circuit. A control component of the electronic control unit activates a discharge unit for discharging an energy storage device upon receiving a sensor signal generated by the sensor when the contact connection is broken.

13 Claims, 2 Drawing Sheets

U.S. PATENT DOCUMENTS

| | | |
|---|---|---|
| 7,999,668 B2 * | 8/2011 | Cawthorne et al. ............ 340/532 |
| 2007/0114077 A1 * | 5/2007 | Goetz et al. .................. 180/54.1 |
| 2009/0073624 A1 * | 3/2009 | Scholer et al. ................... 361/88 |
| 2010/0040931 A1 * | 2/2010 | Hortop et al. .................... 429/34 |
| 2011/0074595 A1 * | 3/2011 | Guo et al. ...................... 340/687 |

FOREIGN PATENT DOCUMENTS

| | | |
|---|---|---|
| DE | 102006006314 A1 | 11/2006 |
| DE | 102005055075 A1 | 5/2007 |
| DE | 102006047039 A1 | 11/2007 |
| EP | 1351107 A1 | 10/2003 |

\* cited by examiner

METHOD AND A DEVICE FOR MONITORING HIGH-VOLTAGE CONNECTIONS OF A HYBRID VEHICLE

CROSS-REFERENCE TO RELATED APPLICATION

This application is a continuation, under 35 U.S.C. §120, of copending international application No. PCT/EP2009/001413, filed Feb. 27, 2009, which designated the United States; this application also claims the priority, under 35 U.S.C. §119, of German patent applications Nos. DE 10 2008 011 962.8, filed Mar. 1, 2008, and DE 10 2008 021 542.2, filed Apr. 30, 2008; the prior applications are herewith incorporated by reference in their entirety.

BACKGROUND OF THE INVENTION

Field of the Invention

The invention relates to a monitoring device for providing over-voltage or shock protection in a hybrid vehicle having a number of high-voltage components and having an electronic control unit which is connected to a low-voltage vehicle electrical system battery and whose power actuators are connected to a high-voltage battery via a power switch and actuate at least one electric machine. The invention also relates to a method for monitoring high voltages of such a hybrid vehicle. Monitoring protection is understood here in particular to be protection against shocks from dangerous voltages (shock protection).

An electric drive system of a drive configuration in a motor vehicle having high-voltage components (hybrid drive, hybrid vehicle, electric vehicle, or fuel cell vehicle) having at least one electric machine (synchronous machine or asynchronous machine) has high-voltage components with voltages which, at present, are already over 300 V (higher than 60 $V_{DC}$, higher than 25 $V_{AC}$). These include, in particular, also power actuators such as, in particular, inverters, power converters and/or transformers, of an electronic control unit or ECU (electronic controller unit).

The high-voltage network which is composed of the high-voltage components and a high-voltage battery which feeds them is usually protected with access protection in order to avoid a risk of injury in the event of contact with the high-voltage components conducting the high voltage. It is therefore possible, for example when the drive system is switched off (and the machine is still turning), to ensure that shock protection is provided against a high voltage which is still available at the motor terminals of the electric machine. It is also necessary, when releasing plug-type contacts or contact connections, as well as when opening the machine housing of the electric machine or the equipment housing of the electronic control unit, which contains the power actuators, to ensure that the high voltage drops in the shortest possible time.

SUMMARY OF THE INVENTION

It is accordingly an object of the invention to provide a method and a device for monitoring high-voltage connections and for overvoltage protection which overcome the above-mentioned disadvantages of the heretofore-known devices and methods of this general type and which provides for a device for providing overvoltage protection of a hybrid vehicle to prevent shocks from a dangerous voltage, which device is of simple design while at the same time providing a high degree of shock protection. Furthermore, a suitable method for providing shock-proof monitoring of the high-voltage components and in particular of the electric machine, or of each electric machine, of a hybrid vehicle is to be specified.

With the foregoing and other objects in view there is provided, in accordance with the invention, a monitoring device for providing protection against electrical shock in a hybrid vehicle having a plurality of high-voltage components, an electronic control unit connected to a low-voltage vehicle electrical system battery, and power actuators connected to a high-voltage battery via a power switch and configured to actuate at least one electric machine. The monitoring device comprises:

a loop circuit for monitoring the high-voltage components and for deactivating the high-voltage components when said loop circuit is opened;

a magnetic-field-sensitive sensor disposed at a releasable contact connection of the electric machine and/or of the electronic control unit, said magnetic-field-sensitive sensor generating a sensor signal when the releasable contact connection is released; and a control module of the electronic control unit connected to said magnetic-field-sensitive sensor and to a discharge unit, said magnetic-field-sensitive sensor being connected to said loop circuit to cause said control module to activate said discharge unit for the shock-proof discharging of an energy accumulator in dependence on the sensor signal generated by said sensor when the contact connection is released.

In other words, the objects are achieved, according to the invention, by providing the monitoring device which serves to provide protection for a hybrid vehicle, in particular for the electric drive system thereof, with which the high-voltage components are monitored through a loop circuit or looped line. This monitoring expediently extends at least to those high-voltage components which are connected together with a high-voltage battery and a power switch (relay or contactor) to a high-voltage voltage network of the hybrid vehicle, and in which a high-voltage shock is possible or cannot be ruled out. These include, in particular, the electric machine, or every electric machine, and the power actuators which feed the latter and are controlled by an electronic control unit (ECU) and are arranged in a corresponding device housing. The control unit is connected to a low-voltage vehicle electrical system battery, for example to a customary 12 $V_{DC}$ battery or 14 $V_{DC}$ battery.

The loop circuit is suitably embodied as a signal line or signal line system which connects to one another all the high-voltage components which are to be monitored. Disconnection or short circuiting to ground or to the positive pole of the vehicle electrical system battery at any desired location within the loop circuit is detected and all the high-voltage components are deactivated. Virtually at the same time, the power switch which serves as the main contactor opens owing to corresponding actuation, and disconnects all the components from the high-voltage network.

The detection of the opened loop circuit which is effective as a high-voltage disconnection circuit or high-voltage disconnection request takes place in a contactless fashion by means of a magnetic-field-sensitive sensor, preferably by means of a Hall sensor, which expediently has a signal output which can be connected to the vehicle electrical system reference potential (ground). The sensor is connected to the loop circuit via a releasable contact connection of the electric machine and/or of the electronic control unit. The connection of the sensor is expediently carried out by its connection into one or more already present signal lines of the drive system in conjunction with the contact connection. The contactless transmission of information (loop circuit open or closed) is suitably embodied in the power-conducting high-voltage plug-type contact or screw-type contact (for example by means of a permanent magnet).

When the contact connection of the signal path or power path is released, the sensor generates a sensor signal on the basis of which the electronic control unit, in particular a function module or control module which is provided for this purpose, activates a discharge unit so that an energy accumulator which is connected into the high-voltage power circuit and is in the form of, in particular, one or more intermediate circuit capacitors is discharged within a very short time. The release of the contact connection can be carried out by pulling off a corresponding plug-type contact or by opening a machine housing of the electric machine or a device housing of the electronic control unit.

The control module of the electronic control unit is suitably coupled to the discharge unit via an optocoupler. When the sensor signal or the voltage value thereof deviates from a reference voltage, the control module generates a control signal for activating the discharge unit. Again, preferably virtually also at the same time, the control module generates a control signal, which blocks the power actuators, when the contact connection is released. The discharging of the energy accumulator or the locking or deactivation of the power actuators takes place whenever the sensor signal, i.e. a voltage value which corresponds thereto or is derived therefrom, undershoots or exceeds a reference value which is expediently derived from the terminal voltage of the low-voltage vehicle electrical system battery. A faulty loop circuit is therefore preferably determined if the sensory voltage value deviates from, for example, half the terminal voltage (+14 V) of the vehicle electrical system battery by a larger or smaller fraction of the terminal voltage.

The electronic control unit has a number of signal inputs, at least two inputs of which are connected to the control module. Further connections or connecting contacts of the control unit are connected to the discharge unit which is itself connected on the output side to the energy accumulator in the form of a typical intermediate circuit capacitor. The connecting contacts serve to connect the electronic control unit to the high-voltage battery.

A first input of the electronic control unit can expediently be connected to the low-voltage vehicle electrical system battery and to a reference input of the control module, as well as expediently via an ohmic resistor to a second input. The loop circuit can be coupled thereto and is connected via a third input of the electronic control unit to a monitoring input of the control module which is referred to below as a signal input.

The signal input of the control module is expediently connected via a controllable semiconductor switch, preferably a bipolar transistor, to the vehicle electrical system potential (ground). The sensor signal or the corresponding voltage value can be conducted to the signal input of the control module in a way which is positionally independent of where the respective magnetic-field-sensitive sensor is located. When there is a contact connection with the electronic control unit, the magnetic-field-sensitive sensor is expediently located within the device housing.

When there is a machine-side contact connection, the sensor is expediently located in the machine housing. In this variant, the sensor is connected to a temperature sensor which is assigned to the corresponding electric machine. In addition to the operationally induced temperature signal, opening of the conductor loop, detected by sensor, as a result of opening of the contact connection can also be conducted to the electronic control unit, as a state that can be correspondingly evaluated, via the usually already existing signal line or line connection of said temperature sensor to the electronic control unit. An evaluation unit which is provided for this purpose and which evaluates, within the electronic control unit, both the temperature signal and the opening of the loop circuit which is detected by the sensor, supplies a corresponding control signal to the transistor. Accordingly, the voltage value at the signal input of the control module is correspondingly changed and the discharge unit for discharging the high-voltage energy accumulators which are connected into the high-voltage power circuit is activated. At the same time, the power actuators are locked.

The advantages which can be achieved with the invention consist in particular in the fact that by means of a magnetic-field-sensitive sensor which is coupled in a virtually contactless fashion to a loop circuit which is effective as an overvoltage-limiting circuit or as what is referred to as a hazardous voltage interlock loop (HVIL), it becomes possible to monitor at least those high-voltage components of a hybrid vehicle which require shock protection, access protection or overvoltage protection, in a way which is particularly reliable and economical both in terms of lines and contacts. As a result, an interruption within the loop circuit can be detected both independently of time and independently of location, and any high-voltage component can be deactivated in a very short time and in addition the residual charge can be removed from the system by the virtually undelayed activation of the discharge unit for the energy accumulators or intermediate circuit capacitors.

The device according to the invention and the method according to the invention are therefore suitable in particular as shock protection against dangerous voltages in a hybrid vehicle. If contact connections in the form of plug-type contacts are opened or by opening a high-voltage component-containing housing, in particular the machine housing of the electric machine or the device housing of the electronic control unit with the power actuators, the actuation of the power actuators is disabled within a very short time and the energy accumulator is discharged virtually at the same time. These measures take place in a contactless fashion owing to the use of the magnetic-field-sensitive sensors and therefore virtually without an additional expenditure on signal lines, in particular by virtue of the fact that the signal lines of the temperature sensor of the electric machine are additionally used for the sensor signal.

With the above and other objects in view there is also provided, in accordance with the invention, a method for monitoring high voltages of a hybrid vehicle having a number of high-voltage components and having an electronic control unit for actuating at least one electric machine and power actuators connected to a high-voltage battery via a power switch. The method comprises:

monitoring the high-voltage components by means of a loop circuit and deactivating the high-voltage components when the loop circuit is opened; and when a contact connection of one or both of the electric machine and the electronic control unit is released, generating a sensor signal with a magnetic-field-sensitive sensor, and activating a discharge unit for shock-proof discharging of an energy storage device.

In other words, the method monitors whether the high-voltage connection, or each high-voltage connection, of a vehicle with high-voltage components is closed. For this purpose, on the one hand, the high-voltage components which are monitored by means of the loop circuit which is effective as a detection circuit or limiting circuit are deactivated when the loop circuit is opened. On the other hand, owing to release of a contact connection which is detected by the sensor within the high-voltage voltage network, the discharging of the energy accumulator or energy storage device, connected to the high-voltage circuit, of the hybrid-electric vehicle drive is activated and the power actuators are disabled. In addition, preferably virtually at the same time the power switch (main contactor, also referred to as a circuit breaker) is activated and the electronic control unit is disconnected from the high-voltage battery.

Other features which are considered as characteristic for the invention are set forth in the appended claims.

Although the invention is illustrated and described herein as embodied in a method and a device for monitoring high-voltage connections of a hybrid vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
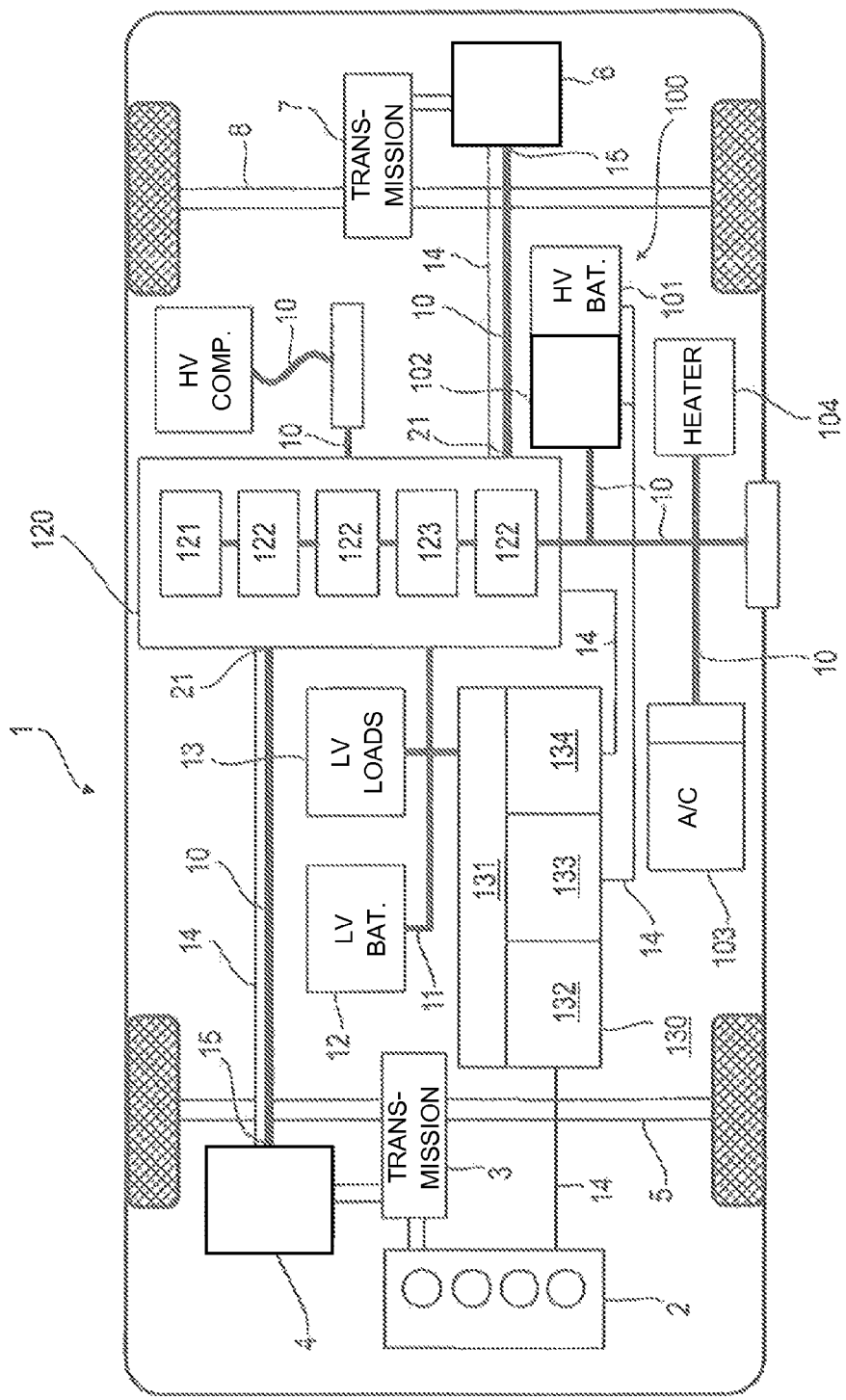
FIG. 1 is a schematic plan view of a drive system of a hybrid vehicle with electric high-voltage components.

Referring now to the figures of the drawing in detail and first, particularly, to FIG. 1 thereof, there is shown a schematic view of a hybrid vehicle 1 with an internal combustion engine 2 which is coupled to a drive axle 5 or front axle 5 of the hybrid vehicle 1 via a transmission 3 that is connected to a first electric machine 4. A second electric machine 6 is coupled in an analogous fashion to a further drive axle 8 or rear axle 8 of the hybrid vehicle 1 via a transmission 7. The electric machines 4 and 6 are, for example, synchronous machines or asynchronous machines.

Figure 2:
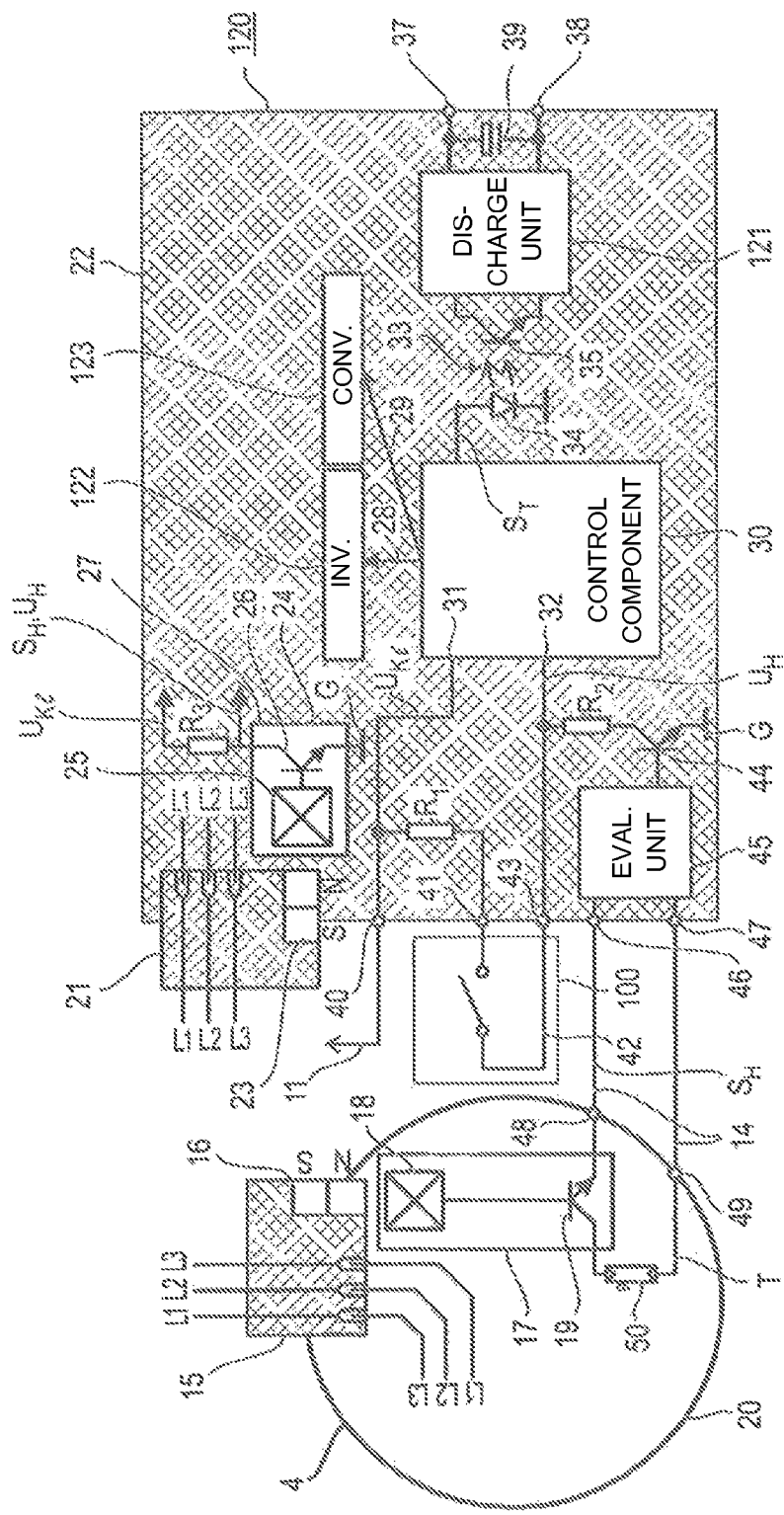
FIG. 2 is a schematic block circuit diagram of the connection of an electric machine and of an electronic control unit to a conductor loop for the provision of shock-proof overvoltage protection by means of Hall sensors.

The electric drive system of the hybrid vehicle 1 has, as electrical or electronic high-voltage components in addition to the electric machines 4, 6, primarily a high-voltage battery (for example 300 V battery) 101 and a power switch (relay, main contactor, circuit breaker) 102 which is assigned thereto, as well as an electrical air-conditioning system 103, a heater 104 and a power inverter unit as a power actuator of an electronic control unit (ECU) 120 which is shown in more detail in FIG. 2. These high-voltage components which are denoted below in their entirety by 100 are connected to one another within a high-voltage voltage circuit or high-voltage voltage network via high-voltage lines 10 and are connected to the electric machines 4, 6.

A 12 V or 24 V vehicle electrical system battery 12 and low-voltage loads 13 are connected via low-voltage lines 11 to the power inverter unit and to a central vehicle control component or vehicle electrical system control component 130. The latter is connected via signal lines 14 to the control unit 120 and to the internal combustion engine 2 and to the high-voltage battery 101.

The electronic control unit 120, which comprises a discharge unit 121 and a power inverter unit as well as one or more transformers (DC/AC inverter) 122 and a power converter/transformer (DC/DC converter) 123 is connected via signal lines 14 to the two electric machines 4, 6.

The vehicle control component or vehicle electrical system control component 130 comprises a superordinate vehicle open-loop or closed-loop controller (vehicle control) 131 to which a motor control unit 132, an energy management system 133 and an open- or closed-loop drive controller (drive control unit) 134 are subordinate. The electric machines 4, 6 are connected via the high-voltage line 10 to the corresponding electric or electronic components (inverters) 122 of the power inverter unit of the control unit 120 via contact connections 15 which are embodied as high-voltage connections.

According to FIG. 2, the machine-side contact connection 15 is embodied as a three-pole plug-type contact with integrated permanent magnet as a signal generator 16 of a Hall sensor 17. The Hall sensor 17 or a Hall IC with integrated evaluation circuit 18 and a transistor 19 is integrated as a controllable semiconductor switch into the electric machine 4, i.e. inserted into the machine housing 20 thereof. The contact connection 15 can also be integrated into the machine housing 20 in such a way that when the machine housing 20 is opened, the contact connection 15 opens and the connection to other high-voltage components 100 is disconnected. Such a contact connection 15 is likewise suitably provided on the machine 6.

A further contact connection 21 is provided on the electronic control unit 120 and there in turn expediently on the device housing 22. The contact connection 21 can also in turn be integrated into the electronic control unit 120 in such a way that when the device housing 22 opens or the housing lid thereof opens, the contact connection 21 is released and therefore the connection to other high-voltage components 100 is opened. A permanent magnet serves in turn as a signal generator 23 of a Hall sensor 24 with an integrated evaluation circuit 25 and with a transistor 26, connected to ground G, as a controllable semiconductor switch. The Hall sensor 24 has a signal output 27 at which a sensor signal $S_H$ or voltage signal $U_H$ can be tapped via an ohmic resistor $R_3$. The voltage value $U_H$ thereof changes during the detection of contact opening of the contact connection 21, since the Hall sensor 24 detects the changing magnetic field of the permanent magnet 23 when the contact connection 21 opens. The contact connections 15, 21 can also be screw-tight connections with a cover and magnet.

The electronic control unit 120 has a control module 30 with a reference input 31 and with a signal input 32. On the output side, the control module 30 is coupled to a discharge unit 121 via an optical coupling 33, which comprises a light-emitting diode 34 and a phototransistor 35. The discharge unit is connected on the output side to connections 37, 38 for connecting the control unit 120 to the high-voltage battery 101. An intermediate circuit capacitor as an energy storage device or energy accumulator 39 is connected between the connections 37, 38. The control module 30, furthermore, has signal connections 28, 29 to the DC/AC converter 122 and to the DC/DC converter 123, respectively.

The reference input 31 of the control module 30 is connected on the inside of the device to a first input 40 of the control unit 120. This input 40 is connected, on the one hand, to the vehicle electrical system battery 12 via the low-voltage line 11. On the other hand, this input 40 is connected on the inside of the device via an ohmic resistor $R_1$ to a second input 41. The latter is in turn connected via a looped line or loop circuit 42 to a further input 43, which is in turn connected inside the device to the signal input 32 of the control module 30 of the electronic control unit 120. A controllable semiconductor switch in the form of a transistor 44 is connected to the signal input 32 and to the signal input 32 on the collector side via an ohmic resistor $R_2$, and to ground G on the center side. On the control side or base side, this transistor 44 is connected to an evaluation unit 45 which is connected on the input side to signal inputs 46, 47 of the control unit 120. The corresponding signal line 14 is connected to said signal inputs 46, 47 and to the signal connections 48, 49 of the electric machine 4. On the machine side, these signal connections 48, 49 are connected to a temperature sensor 50. The collector/emitter path of the transistor 19 of the sensor 17 is connected into the connection between the temperature sensor 50 and the signal connection 48. The evaluation circuit 18 of said sensor 17 actuates the transistor 19 as a function of the state of the contact connection 15.

The electrical loop circuit 42 for providing shock protection connects at least those high-voltage components 100 of the hybrid vehicle 1 which are to be monitored and on which shock protection is provided. If a contact connection is opened on one of these high-voltage components 100, by, for example, a corresponding device being opened or a plug contact being released, the control module 30 of the electronic control unit 120 generates a control signal $S_T$ in order to activate the discharge unit 121. The energy accumulator 39 is discharged at least approximately simultaneously with the actuation of the main contactor 102 and therefore the interruption of the high-voltage voltage circuit 100. When the loop circuit 42 is open owing to a short-circuit or disconnection of a high-voltage component 100, which is illustrated by the opened switch symbol, the voltage value $U_H$ at the signal input 32 of the control module 30 changes.

Similarly, the control module 30 generates the control signal $S_T$ if the device-side contact connection 21 of the electronic control unit 120 is opened. If the device-side contact connection 21 is then opened, the sensor 24 generates a corresponding voltage value $U_H$ at the signal input 32 of the control module 30. For this purpose, the transistor 26 of the Hall sensor 24 and the transistor 44 are connected in series in a way which is not illustrated in more detail, with the transistor 26 being connected on the collector side to the resistor $R_2$ and on the center side to the transistor 44. The resistor $R_3$ which is illustrated can then be dispensed with. Alternatively, the transistor 26 of the Hall sensor 24 can be connected to a further input (not illustrated) of the control module 30, and the resistor $R_3$ can be connected to the reference voltage $U_{KI}$.

The control module 30 compares the current voltage value $U_H$ with a reference value $U_{KI}$, which preferably corresponds to the terminal voltage $U_{KI}=(+)14V$ of the vehicle electrical system battery 12. During interruption-free and fault-free operation, this voltage value $U_H$ at the signal input 32 of the control module 30 is expediently set as a test signal to half the terminal voltage $U_{KI}$ of the vehicle electrical system battery ($U_H=\frac{1}{2}U_{KI}$). At a separate input of the control module 30, this voltage value is approximately zero volts (0V). Changing this voltage value $U_H$ owing to opening of the contact connection 21 is therefore used by the control unit 120 to activate the discharge unit 121 by virtue of the connection of the device-side sensor 24 to the conductor loop 42.

In an analogous fashion, the machine-side sensor 17 is also connected to the conductor loop 42. For this, use is made of the signal line 14 of the temperature sensor 50, via which signal line 14 the operationally induced temperature signal T of the temperature sensor 50 is conducted to the evaluation unit 45. If the machine-side contact connection 15 is opened, this is detected by the sensor 17. To do this, the evaluation circuit 18 actuates the transistor 19 in such a way that, for example, no temperature signal T, or an implausible temperature signal T, is conducted to the evaluation unit 45 via the signal line 14. This information or this state is detected virtually as a corresponding sensor signal $S_H$ by the evaluation unit 45 so that a corresponding control signal is conducted to the control input (base) of the transistor 44 and the latter is correspondingly actuated. Accordingly, the voltage value $U_H$ changes in turn at the signal input 32 of the control module 30. The machine-side sensor 17 is therefore also connected to the conductor loop 42, in turn in particular via the signal input 32 of the control module 30.

When the contact connection 15 or 21 is opened, the voltage value $U_H$ at the signal input 32 also deviates from the reference value ($U_H=\frac{1}{2}U_{KI}$) of the control module 30. For example a faulty loop circuit 42 or an opened contact connection 15, 21 is therefore detected if the voltage value $U_H$ is greater than $\frac{2}{3}$ or less than $\frac{1}{3}$ of the terminal voltage $U_{KI}$. In such a case of the reference value $\frac{1}{2}U_{KI}$ being undershot or exceeded, the main contactor 102 is opened and therefore virtually any high-voltage component 100 is deactivated. At the same time, owing to the actuation of the discharge unit 121 via the control module 30 of the electronic control unit 120, the residual charge stored in the energy accumulator 39 is removed from the high-voltage system of the hybrid vehicle.

Such deactivation of the high-voltage components 100 and activation of the discharge unit 121 for the discharge of the energy accumulator 39 ensures reliable shock protection or access protection within a very short time. This is a significant safety aspect in particular in the case of maintenance work and repair work to the hybrid vehicle 1 in order to avoid potential risks of injury owing to contact with high-voltage components 100 which correspondingly conduct high voltages. Electric shock protection through the deactivation of the high-voltage components 100 on the one hand and the virtually simultaneous activation of the discharge unit 121 in order to reduce the residual charge of the energy accumulators 39 to zero or to non-hazardous voltage values within a very short time takes place expediently if the loop circuit 42 is disconnected, a short circuit to ground G or to the positive potential (+) 14 V takes place within the conductor loop 42 or if the 14 V vehicle electrical system voltage $U_{KI}$ is absent, i.e. $U_{KI}=0$.

The invention claimed is:

1. A monitoring device for providing protection against electrical shock in a hybrid vehicle having a plurality of high-voltage components, an electronic control unit connected to a low-voltage vehicle electrical system battery, and power actuators connected to a high-voltage battery via a power switch and configured to actuate at least one electric machine, the monitoring device comprising:
   a loop circuit for monitoring the high-voltage components and for deactivating the high-voltage components when said loop circuit is opened;
   a magnetic-field-sensitive sensor disposed at a releasable contact connection of the electric machine and/or of the electronic control unit, said magnetic-field-sensitive sensor generating a sensor signal when the releasable contact connection is released; and
   a control module of the electronic control unit connected to said magnetic-field-sensitive sensor and to a discharge unit, said magnetic-field-sensitive sensor being connected to said loop circuit to cause said control module to activate said discharge unit for the shock-proof discharging of an energy accumulator in dependence on the sensor signal generated by said sensor when the contact connection is released.

2. The device according to claim 1, wherein said control module of the electronic control unit is configured to generate a control signal for activating the discharge unit when the sensor signal deviates from a reference voltage.

3. The device according to claim 1, wherein said control module is configured to generate a control signal for locking the power actuators as a function of the sensor signal generated by the sensor when the contact connection is released.

4. The device according to claim 1, wherein said control module is configured to activate the discharging of the energy accumulator when a fraction of a terminal voltage of the low-voltage vehicle electrical system battery is exceeded and/or undershot.

5. The device according to claim 1, wherein the electronic control unit has a first input connectable to the low-voltage vehicle electrical system battery and connected, via a second input and via said loop circuit that is connectable thereto, to a third input that is connectable to a vehicle electrical system reference potential via a controllable semiconductor switch.

6. The device according to claim 5, wherein said first input is connected to a reference input, and said third input is connected to a signal input of said control module.

7. The device according to claim 1, wherein in that the magnetic-field-sensitive sensor is connected to a temperature sensor, which is assigned to the electric machine and is connected to the electronic control unit via a signal line, in such a way that when the machine-side contact connection is released, the sensor signal is fed to the electronic control unit via the signal line of the temperature sensor.

8. The device according to claim 7, wherein the electronic control unit includes a controllable semiconductor switch connected on an actuation side to an evaluation unit for evaluating a temperature signal conducted via said signal line.

9. The device according to claim 1, wherein said magnetic-field-sensitive sensor of the releasable contact connection of the electronic control unit comprises a signal output that can be connected to a vehicle electrical system reference potential.

10. The device according to claim 1, wherein the power switch opens when said loop circuit is opened, and disconnects the electronic control unit from the high-voltage battery.

11. The device according to claim 1, wherein said magnetic-field-sensitive sensor is a Hall effect sensor.

12. A method for monitoring high voltages of a hybrid vehicle having a number of high-voltage components and having an electronic control unit for actuating at least one electric machine and power actuators connected to a high-voltage battery via a power switch, the method which comprises:

monitoring the high-voltage components by means of a loop circuit and deactivating the high-voltage components when the loop circuit is opened; and when a contact connection of one or both of the electric machine and the electronic control unit is released, generating a sensor signal with a magnetic-field-sensitive sensor, and activating a discharge unit for shock-proof discharging of an energy storage device.

13. The method according to claim 12, which comprises, when the loop circuit is opened, activating the power switch and disconnecting the electronic control unit from the high-voltage battery.

* * * * *